(12) United States Patent
Stevens

(10) Patent No.: US 9,942,703 B2
(45) Date of Patent: Apr. 10, 2018

(54) OUTDOOR TRACKING METHOD AND DEVICE

(71) Applicant: Mac Daddy's Legendary Outdoors, LLC, Knoxville, TN (US)

(72) Inventor: Mac C. Stevens, Knoxville, TN (US)

(73) Assignee: Mac Daddy's Legendary Outdoors, LLC, Knoxville, TN (US)

( * ) Notice: Subject to any disclaimer, the term of this patent is extended or adjusted under 35 U.S.C. 154(b) by 0 days.

(21) Appl. No.: 15/227,090

(22) Filed: Aug. 3, 2016

(65) Prior Publication Data

US 2017/0041741 A1 Feb. 9, 2017

Related U.S. Application Data

(60) Provisional application No. 62/200,278, filed on Aug. 3, 2015.

(51) Int. Cl.
| | |
|---|---|
| *H04W 24/00* | (2009.01) |
| *H04W 4/02* | (2018.01) |
| *H04L 29/08* | (2006.01) |
| *H04L 12/58* | (2006.01) |
| *G06F 3/0481* | (2013.01) |
| *G06F 3/0484* | (2013.01) |
| *H04W 88/02* | (2009.01) |

(52) U.S. Cl.
CPC .......... *H04W 4/02* (2013.01); *G06F 3/04817* (2013.01); *G06F 3/04842* (2013.01); *H04L 51/24* (2013.01); *H04L 51/26* (2013.01); *H04L 51/32* (2013.01); *H04L 67/18* (2013.01); *H04L 67/22* (2013.01); *H04L 67/26* (2013.01); *H04L 67/306* (2013.01); *H04W 88/02* (2013.01)

(58) Field of Classification Search
CPC ........ H04W 4/02; H04W 88/02; H04L 51/32; H04L 51/24; H04L 51/26; H04L 67/26; H04L 67/306; H04L 67/22; H04L 67/18; G06F 3/04817; G06F 3/04842
USPC ...................................... 455/456.3
See application file for complete search history.

(56) References Cited

U.S. PATENT DOCUMENTS

| | | | | |
|---|---|---|---|---|
| 8,612,278 | B1* | 12/2013 | Ashley, Jr. ............. | G06Q 30/02 705/7.11 |
| 9,511,285 | B2* | 12/2016 | Hawkins, III ......... | G06Q 10/00 |
| 9,560,426 | B1* | 1/2017 | Daniel .................. | H04L 67/125 |
| 2007/0229350 | A1* | 10/2007 | Scalisi ................... | H04L 67/26 342/350 |
| 2015/0024781 | A1* | 1/2015 | Konicek ........... | H04M 1/72513 455/456.2 |

\* cited by examiner

*Primary Examiner* — Amancio Gonzalez
(74) *Attorney, Agent, or Firm* — Pitts & Lake, P.C.

(57) ABSTRACT

Systems and methods of using a communication device having location identification technology to manage tracking information of a plurality of users, the method including storing identification information of a plurality of respective users, tracking locations of the users by receiving location information from each of the users' respective communication devices, and displaying the location information along with associated identification information of the users on a display screen of the communication device.

19 Claims, 14 Drawing Sheets

OUTDOOR TRACKING METHOD AND DEVICE

CROSS-REFERENCE TO RELATED APPLICATIONS

This application claims the benefit of U.S. Provisional Patent Application Ser. No. 62/200,278, filed on Aug. 3, 2015, which is incorporated herein in its entirety by reference.

FIELD OF INVENTION

The present general inventive concept relates to outdoor safety, and, more particularly, methods and devices to track outdoor movements and locations of people and landmarks.

BACKGROUND

While many people enjoy the pleasures of outdoors recreational activities such as hiking, camping, hunting, etc., one must always be aware of the inherent dangers that an outdoorsman may be faced with at any given moment. For example, hikers and explorers may suffer an immobilizing injury, and may be faced with having to rely on a rescue party or person for assistance. As another example, hunters must always be wary of other hunters in the area to avoid injuring another, or being injured by another, through the negligent discharge of a firearm or other weapon. Traditionally, hunters and other outdoorsmen will wear an easily seen color, typically blaze orange, to allow other hunters to readily differentiate the person wearing that color from animals and foliage. However, the effectiveness of such a marking loses its effectiveness if the wearer is beyond the line of sight of other hunters. Thus, it is desirable for a user to have a convenient way of tracking his or her movement, as well as those in the surrounding areas.

BRIEF SUMMARY

According to various example embodiments of the present general inventive concept, a method may be provided by which a communication device is operated to associate identification information with users of a tracking program operated on the communication device, and to display location information and identification information of the users on a display screen of the device, so that a user is able to identify users of the tracking program and differentiate those users from wildlife in an outdoors setting. One benefit of such a method is the creation of a virtual blaze orange to allow outdoorsmen the ability of "seeing" others in their area that may be beyond their direct line of sight.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a method of using a communication device having location identification technology to manage tracking information of a plurality of users, the method including storing identification information of a plurality of respective users, tracking locations of the users by receiving location information from each of the users' respective communication devices, and displaying the location information along with associated identification information of the users on a display screen of the communication device.

The foregoing and/or other aspects and advantages of the present general inventive concept may also be achieved by a method of using a communication device having location identification technology to manage tracking information of a plurality of users, the method including tracking locations of a plurality of users at communication devices of each of the respective users by receiving location information from each of the respective communication devices, and displaying the location information of each of the users on a display screen of the communication devices, wherein users for which the location information is displayed have logged in to a tracking program the controls their respective communication devices to perform the method of managing the tracking information.

The foregoing and/or other aspects and advantages of the present general inventive concept may also be achieved by method of using a plurality of communication devices having location identification technology to manage tracking information of a plurality of users respectively associated with the communication devices, the method including prompting a user to log in to a tracking program stored on the user's communication device that performs the method of managing the tracking information, selectively displaying a GUI to allow the user to select other users to be part of an active group, or to join an already formed active group, and displaying a navigation GUI including mapping information indicating location information of any users in a displayed area that are logged in to the tracking program, wherein the location information of the users are displayed as corresponding icons on the navigation GUI, and icons associated with the active group are visually differentiated from users that are not associated with the active group.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings, some of which illustrate example embodiments of images that may be displayed on a screen of a communication device according to various example embodiments of the present general inventive concept, in which.

DETAILED DESCRIPTION

Figure 2:
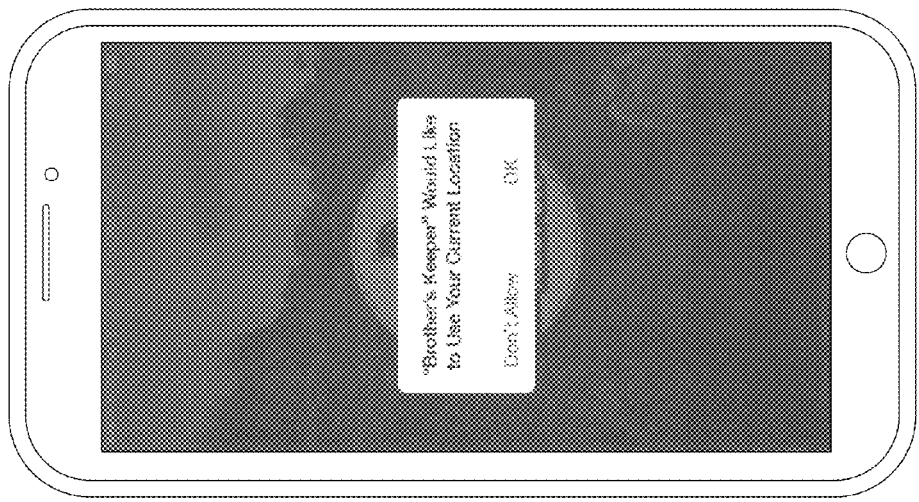
FIG. 2 illustrates a displayed GUI prompting the user to allow the tracking program to use current location coordinates according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Although many of the example embodiments described herein may refer to hunters, it is understood that the present general inventive concept may easily apply to any outdoorsman, or even users in a more urban setting. Also, while the example embodiments described herein typically are discussed in terms of a software application operated on a smartphone, it will be understood by those skilled in the art that a host of other example embodiments may be applicable to the present general inventive concept. For example, the methods and/or operations described herein may be performed on a dedicated communication device, or may be software implemented by a host of different communication devices such as a laptop computer, portable video game, and so on. Typically, such devices will be able to perform coordinate gathering information through, for example, receiving GPS signals, GNSS signals, signals from nearby cell towers, etc., that allow the device to determine location coordinates to share with other devices using the method in order to indicate the presence and status of other users.

According to various example embodiments of the present general inventive concept, a communication device with a display and user interface will perform operations according to a machine readable program to act as a tracking device for one or more users. The machine readable program may be embodied as an application (an "app") stored on a smartphone or other mobile communication device. The application may also be run on non-mobile devices which wish to keep track of mobile users using the program. According to various example embodiments, the operations may be performed according to a navigational mobile device (e.g., smartphone) application used to enhance hunter safety with the concept of creating a virtual or digital blaze orange to see and be seen by other hunters using smart phone capabilities. Blaze orange outerwear is traditionally used by outdoorsmen to help identify and differentiate between people and game animals. By the same token the application according to the present general inventive concept may, where internet reception or other wireless communication (e.g., cellular data communication) is available, let users know where other application users are in the field, whether those other users be hunters, hikers, campers, trail riders, etc. Hence, the users are provided with a virtual or digital blaze orange, since the device tracking indicates those users as being other than animals.

According to various example embodiments of the present general inventive concept, the application may have the functionality for one or more operations such as, for example: the ability to link with other members of a user's party so their location can be displayed, identifying each member with a custom entry; the ability to visually estimate distances between party members on a display screen; a broader capability to see generically other outdoorsman in the area using the same app, particularly important during hunting season to make sure shooting lanes are safe; the ability to track fellow party members' movement paths; the ability to see fellow party members' battery levels; the ability to initiate an audible distress signal even when the sound is turned off and flash the camera light; an emergency distress button that will send out alerts/notifications to preset or designated persons; the ability to mark multiple waypoints, or points of interest, such as, for example, automobile location, campsite, and other custom field entries; as well as other useful operations to help track and safeguard users.

The application may be transferred to a communication device such as, for example, a smartphone through either a wired or wireless connection. The images included in many of the Figures discussed herein show various displays that may be displayed on the screen of a user's communication device. It is understood that various example embodiments of the present general inventive concept may involve displaying different displays than those shown in the discussed drawings, displaying fewer images, displaying more images, and so on. Further, although the images illustrated in the drawings are shown as being displayed on the screen of a smartphone, which is not meant to limit the application to any brand or type of smartphone similar to that illustrated, it is understood that the present general inventive concept may be executed on a host of other devices. In the various descriptions herein, the terms "application" and "program" may be used interchangeably to refer to the machine readable instructions that control the communication device to perform the various operations described. Also, the program may be referred to as the "tracking program" herein, although it is understood that the program may include many other features besides tracking, such as some of the examples described below.

Figure 1:
FIG. 1 illustrates a title page of the application according to an example embodiment of the present general inventive concept.

FIG. 1 illustrates a title display of the application according to an example embodiment of the present general inventive concept. It is understood that displays may be referred to as "pages", "screens", "GUI's", etc., at various points in the descriptions herein. According to various example embodiments, such a title display may be displayed on the display screen of the communication device while the application program is loading, i.e., upon the user launching the program, or perhaps during various other processing intervals. The image may include photographic or illustrated images, indicia, etc., such as the BROTHER'S KEEPER™ logo, also known as a splash screen, shown in FIG. 1.

According to various example embodiments of the present general inventive concept, the user may be prompted to let the application use location coordinates determined by the smartphone, or received by the smartphone, upon the tracking program being loaded, or while the tracking program is being loaded. FIG. 2 illustrates a displayed GUI (graphical user interface) prompting the user to allow the tracking program to use current location coordinates according to an example embodiment of the present general inventive concept. As shown in FIG. 2, the application controls the communication device to display a GUI to the user to prompt such a choice, and the user may choose whether to allow the tracking program to use the current location coordinates by touching the corresponding area of the display screen.

Figure 3:
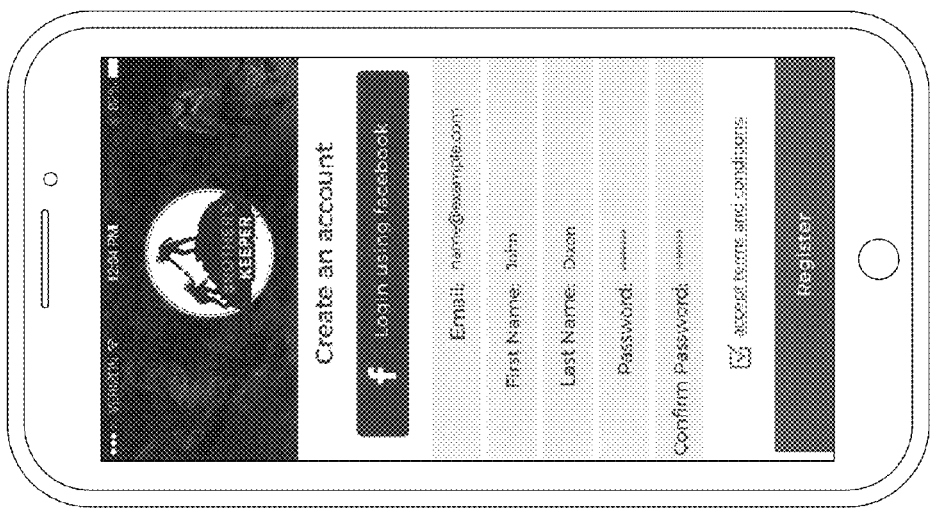
FIG. 3 illustrates a displayed GUI to prompt user information according to an example embodiment of the present general inventive concept.

If a user is using the tracking program for the first time, the user may be prompted to create an account which will store the user's information for current and future usage in the tracking program, as well as for potential sharing with associated users using the tracking program. According to various example embodiments, the user may be able to register by entering an email address, first and last name, desired password, and desired password confirmation, an acceptance of usage terms and conditions, and so on. FIG. 3 illustrates a displayed GUI to prompt user information according to an example embodiment of the present general inventive concept. As also illustrated in FIG. 3, the user may be able to register using identification data already stored/associated with other applications such as social media applications. In various example embodiments of the present general inventive concept, the user may be presented with a display of terms and conditions that may be agreed to before the user is able to continue using the tracking program, or before the user can have access to the full functionality of the tracking program. The user may be prompted to choose options indicating whether the terms and conditions are accepted. In example embodiment illustrated in FIG. 3, the user is given the option of logging and/or register using Facebook. In various example embodiments, once the user is registered, the user may be able to login to the tracking program using the registered email address and password. In various example embodiments, the user information may be stored in a data storage such as a server that may be remotely located and which communicates with the communication device through computer data communication.

Figure 4:
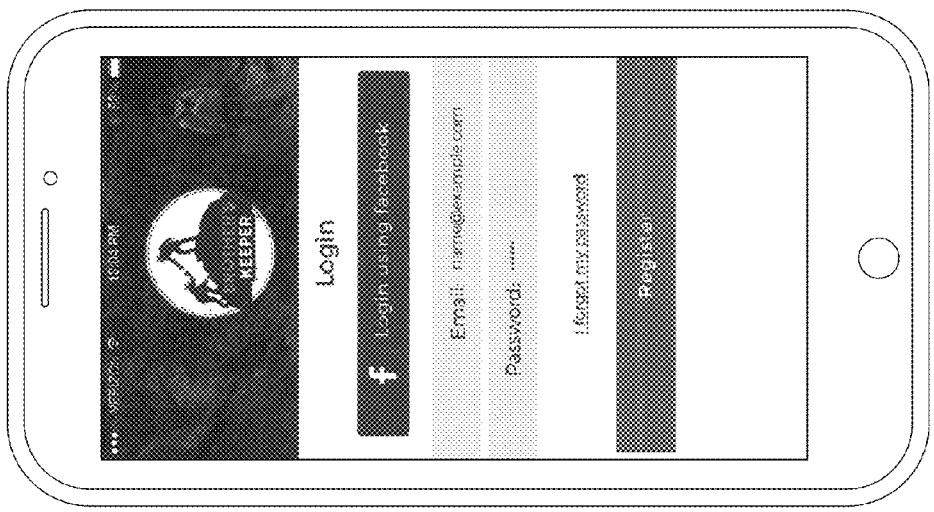
FIG. 4 illustrates a displayed GUI to prompt user login information according to an example embodiment of the present general inventive concept.

FIG. 4 illustrates a displayed GUI to prompt user login information according to an example embodiment of the present general inventive concept. As illustrated in FIG. 4, and similar to the embodiment illustrated in FIG. 3, the user may be able to use other communicating applications such as Facebook to enter the login information. If the user is unable to remember the password, the user may be able to choose an option indicating that the user has forgotten the password, at which point the user may be prompted to reset the password, or to receive a communication having a reminder about the password, or the password itself. The user may be able to choose a log out function on the display of the device whenever the tracking program is not going to be used.

Figure 5:
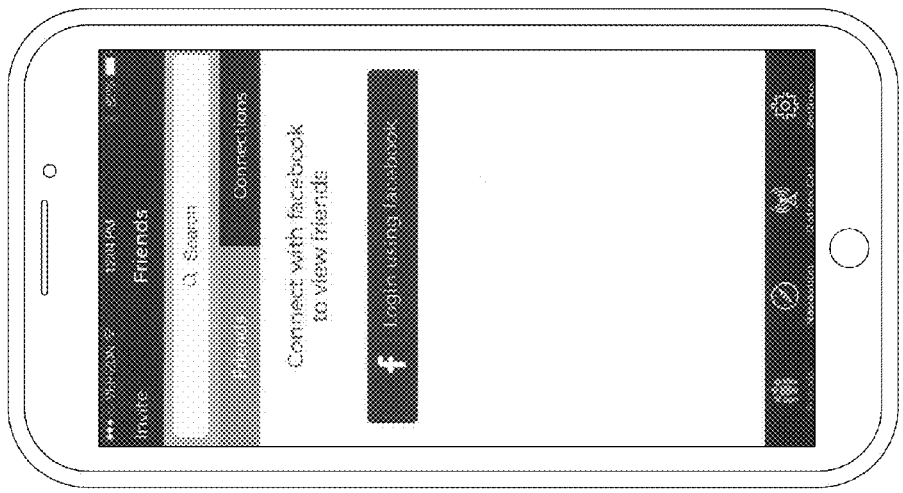
FIG. 5 illustrates a displayed GUI to prompt a user to connect with another social media application to view friends using that application according to an example embodiment of the present general inventive concept.

According to various example embodiments of the present general inventive concept, the user may be provided with the opportunity to view friends using one or more social media platforms and connect with them in the tracking program. FIG. 5 illustrates a displayed GUI to prompt a user to connect with another social media application to view friends using that application according to an example embodiment of the present general inventive concept. In the example embodiment illustrated in FIG. 5, the user is prompted to login using Facebook to connect and view friends. The program may then control the communication device to display friends logged into Facebook, and friends that are connected through the tracking program. Thus, if the user has not logged in with Facebook, or another social media platform desired by the user, the user will be able to connect with Facebook to view the Facebook friends by using the login option displayed on the user's screen. A search window may also be displayed to the user such that the user is able to search for another user by first or last name, and to view all associated results. For example, the user may be able to select a search result connected with the user.

Figure 6:
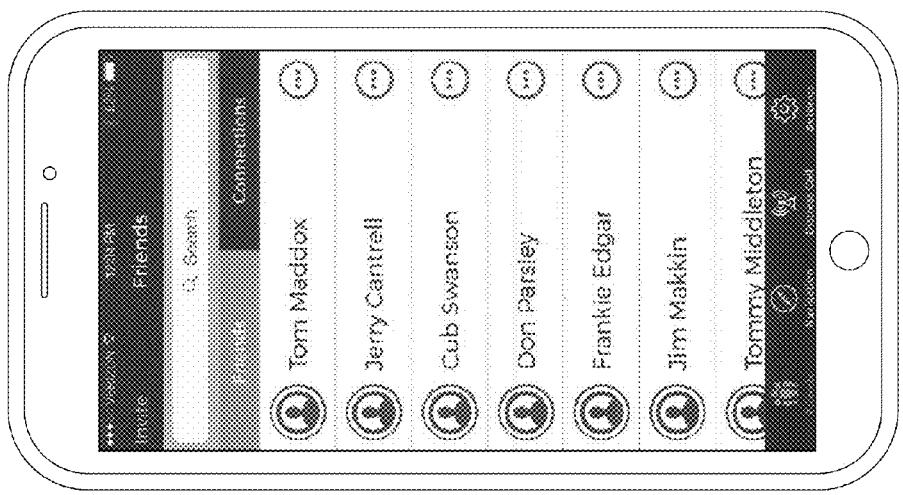
FIG. 6 illustrates a displayed GUI showing a social media platform a user has logged into through the tracking program according to an example embodiment of the present general inventive concept.

FIG. 6 illustrates a displayed GUI showing a social media platform a user has logged into through the tracking program according to an example embodiment of the present general inventive concept. In the example embodiment illustrated in FIG. 6, a display is shown in which a user has logged in to a social media platform such as Facebook, and the user's Facebook friends are displayed. The user may have prompted this list to be displayed by choosing the Friends button under the search window, which may be part of the displayed GUI in various example embodiments of the present general inventive concept. Various example embodiments of the GUI of FIG. 6 may also include a Connections button. When the user chooses the Connections button under the search window, a list of friends that have connected to the user in the tracking program may be displayed.

Figure 7:
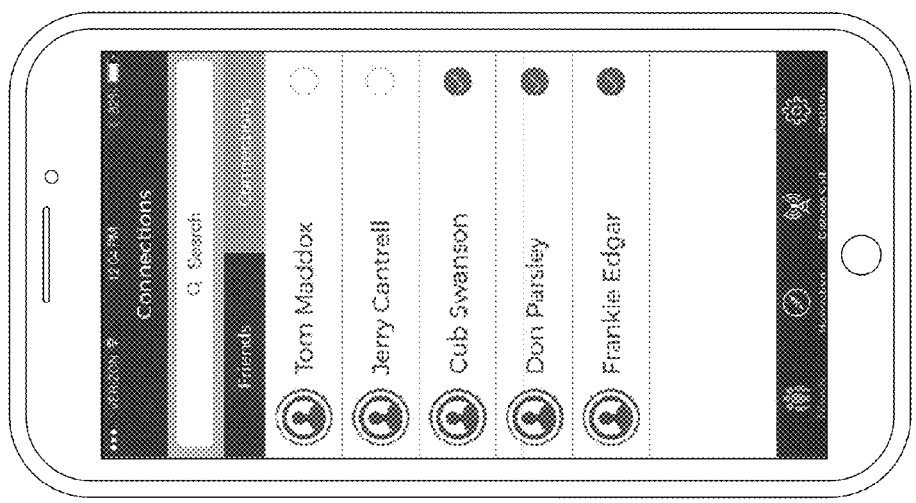
FIG. 7 illustrates a displayed GUI showing a list of connected friends in the tracking program according to an example embodiment of the present general inventive concept.

FIG. 7 illustrates a displayed GUI showing a list of connected friends in the tracking program according to an example embodiment of the present general inventive concept. The example embodiment of the GUI illustrated in FIG. 7 shows a list of connected friends in the tracking program, with indicators displayed to show whether the connected friends are currently logged into the tracking program or social media platform. In various example embodiments, the user may be offered the choice to remove any connection with another user that is in the Connections list. The term "immediate user" may be used in some instances herein to differentiate the user viewing the display screen in some of the drawings from other users of the tracking program.

Figure 8:
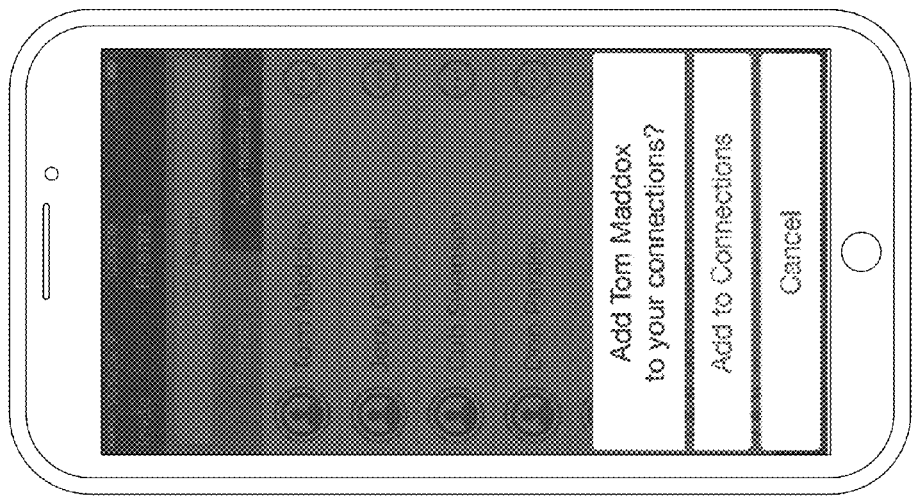
FIG. 8 illustrates the displayed GUI of FIG. 7 after a user has chosen a friend to add to the connections list according to an example embodiment of the present general inventive concept.

FIG. 8 illustrates the displayed GUI of FIG. 7 after a user has chosen a friend to add to the connections list according to an example embodiment of the present general inventive concept. It is understood that the names displayed in the drawings of this application are fictional and offered for simplicity and ease of understanding, and are not intended to be associated with any actual people. The example embodiment illustrated in FIG. 8 shows a display in which a user has chosen the friends button to display the user's Facebook friends currently logged in, and wherein the user has chosen the name Tom Maddox to be added to the Connections list. The tracking program has controlled the device to display a prompt to the user asking the user to either add Tom Maddox to the Connections list, or to cancel the operation. In various example embodiments, a user may be able to search for friends in the Connections list by first and last name. In various example embodiments, a user will be able to indicate that another user in the Connections list is part of an active group that is currently traveling with the user. In various example embodiments, only those users designated as part of the traveling group will have tracking functions being performed. For example, the tracking program may only keep tracking information and attempt to locate the selected members in the traveling group, such as a hunting party. The user may be able to choose to have the active group to be displayed, such that the user can remove one or more users from the active group. It is understood that the various buttons, arrangements thereof, and overall aesthetics of the GUI's illustrated in the drawings are offered as example embodiments only, and may be changed in a host of ways to present the information, or more or less information, without departing from the scope of the present general inventive concept.

Figure 9:
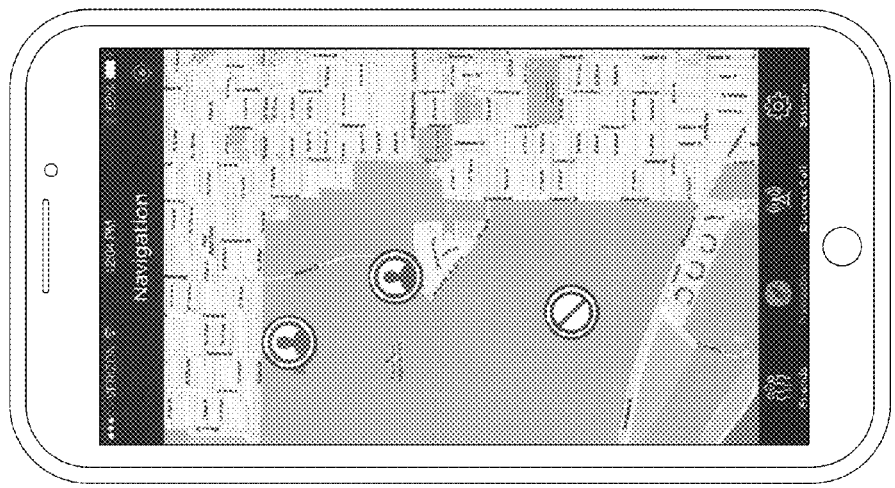
FIG. 9 illustrates a displayed navigation screen according to an example embodiment of the present general inventive concept.

Once an active group has been selected and entered into the communication device by the user, and/or by other members of the active group, the communication device may be controlled by the tracking program to display members of the active group only, or may be controlled to differentiate between connected members of the active group and other connected members, etc., according to various example embodiments of the present general inventive concept. FIG. 9 illustrates a displayed navigation screen according to an example embodiment of the present general inventive concept. Similar to the other screens discussed herein, this navigation screen is also a GUI, and in some example embodiments includes selectable icons in the map area referring to people, places, etc. The example embodiment illustrated in FIG. 9 shows a navigation screen displayed by the tracking program that indicates, through easily discernible visual markers on a map, other users of the tracking program. In various example embodiments, the display may differentiate between users of the tracking program that are on the user's connections list but not in the active group (such as, for example, showing such non-active group users in green), users that are on the connections list and are in the active group (such as, for example, showing such active group user in orange), and users of the tracking program that are neither on the immediate user's connections list nor in the active group but are nevertheless in the vicinity shown on the map display (such as, for example, the slash indicator shown near the bottom of the park in FIG. 9). Various example embodiments may use any of a number of other icon colors and/or configurations to identify other users of the tracking program and their locations. For example, instead of the upper body silhouette shown in FIG. 9, connected users in the active group may be illustrated as a hunting weapon, such as a rifle, to indicate the known members of a hunting party. Such use of different icons may be valuable especially in the case in which users of the tracking program that are not on the immediate user's connection list are hunting, and therefore may be indicated as carrying a projectile weapon or other such device that could endanger others in the vicinity. The user may be able to select one of the displayed icons to view information relating to the user corresponding to the selected icon. For example, if the user selects the top icon shown in FIG. 9, which may be indicated as orange in a full color screen to show that the user is in the active group, the user identification information associated with the selected icon may be displayed.

Figure 10:
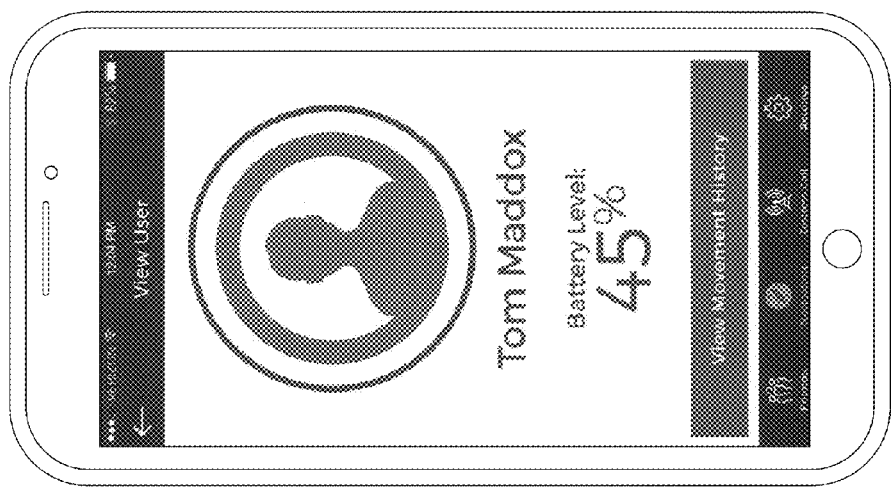
FIG. 10 illustrates a selected user information screen according to an example embodiment of the present general inventive concept.

FIG. 10 illustrates a selected user information screen according to an example embodiment of the present general inventive concept. In the example embodiment illustrated in FIG. 10, the top user icon of the display illustrated in FIG. 9, which may be a GUI, has been selected by the user so that more information about the selected member will be displayed on the screen of the selecting user's communication device. The example embodiment of FIG. 10 illustrates various pieces of information that may be displayed in regard to the selected user. In this example, the user associated with the selected icon is identified by name, and the battery level of that user's communication device is displayed. The user of the tracking program is also able to selectively view the movement history of the active group user associated with the selected icon. In various example embodiments of the present general inventive concept, users of the tracking program may be able to view help overlays for friends and map displays.

Figure 12:
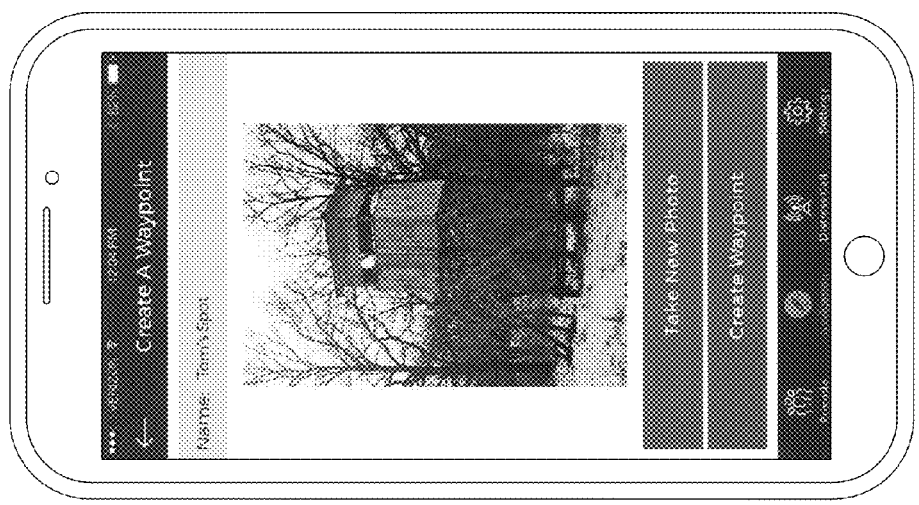
FIG. 12 illustrates the GUI of FIG. 11 with a photograph of the waypoint according to an example embodiment of the present general inventive concept.
Figure 11:
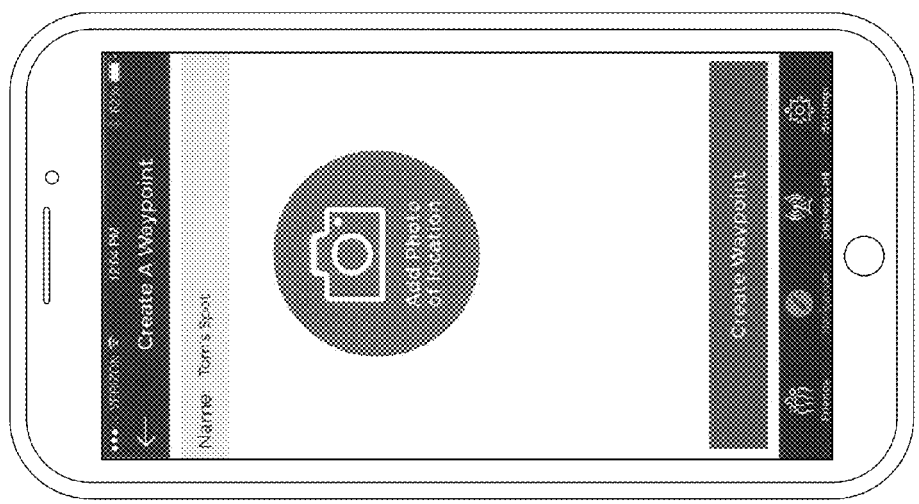
FIG. 11 illustrates a displayed GUI for creating a waypoint according to an example embodiment of the present general inventive concept.

Various example embodiments of the present general inventive concept may allow the user to select his or her current location as a waypoint, and save the location to the map to viewed by that user or other users of the tracking program. The user may also be able to label the created waypoint to indicate the nature of the waypoint. For example, the user may label the waypoint as a campsite, car, hunting platform, etc. FIG. 11 illustrates a displayed GUI for creating a waypoint according to an example embodiment of the present general inventive concept. Such a display may be prompted in a number of ways by the user of the tracking program. For example, the displayed map of FIG. 9 may also indicate where the user is currently located, and the user may simply tap that location on the screen, or hold the touch for a predetermined time, to prompt the communication device to display the "Create A Waypoint" screen. Various other example embodiments may allow the waypoint creation operation to be prompted by other processes, such as the selection of a dedicated button on the GUI, or by a voice prompt, etc. Various of the selection operations discussed herein may be actuated by voice prompts recognized by the communication device, to make the application more friendly to users wearing thick gloves and the like. Similarly, the selectable buttons on the displayed GUI's may be presented in an overlarge configuration to aid in users wearing thick gloves, as many hunting activities occur during the cold winter months. In the example embodiment illustrated in FIG. 11, the displayed GUI that prompts the user for waypoint creation data asks for a name for the waypoint, and also allows the user to add a photo of the location, which will be associated with the waypoint and available for other users to access, to provide more visual information corresponding to the area. In this example embodiment, the user of the tracking program has selected the option of creating a waypoint, and has named the waypoint "Tom's Spot". The illustrated "Add Photo" button of the GUI illustrated in FIG. 11 may prompt the camera function of the communication device to be activated, and automatically upload the image associated with the spot when taken by the user. FIG. 12 illustrates the GUI of FIG. 11 with a photograph of the waypoint according to an example embodiment of the present general inventive concept. In the example embodiment illustrated in FIG. 12, the user has chosen the add photo button of the GUI illustrated in FIG. 11, and subsequently used the communication device to take a photograph of the location. In various example embodiments of the present general inventive concept, the photo may be immediately displayed in the GUI and the user may be prompted to take a new photo or create the waypoint. Adding the photograph to the location that has already had its coordinates associated with the name "Tom's Spot" provides an even richer presentation of the spot to other users, and makes it easier to positively identify. According to various example embodiments, the user may choose the option of taking a new photograph to be used instead of, or along with, the displayed photo. Additionally, the user has been provided the option of saving the waypoint with the associated information.

Figure 13:
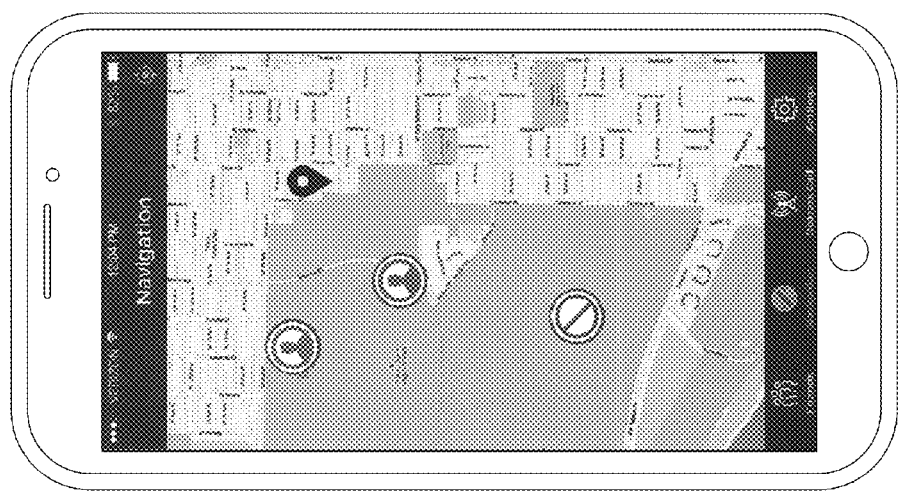
FIG. 13 illustrates a navigation GUI showing a waypoint icon according to an example embodiment of the present general inventive concept.

Once such a waypoint has been created, a corresponding icon may be displayed on the Navigation map to indicate the location of the indicated waypoint. Thus, users of the tracking program are able to select the waypoint icon on the map to see the name and photo and/or other associated information related to the waypoint. FIG. 13 illustrates a navigation GUI showing a waypoint icon according to an example embodiment of the present general inventive concept. In the example embodiment illustrated in FIG. 13, users of the tracking program that are able to see the icon for the "Tom's Spot" waypoint see the icon displayed on the navigation screen of a device on which the tracking program is being used. In various example embodiments, users may be able to see a waypoint created by another user in the active group along with the name of the user that created it. In various example embodiments, a user of the tracking program may be able to select the waypoint and use a mapping function available to the communication device, such as, for example, Apple Maps or Google Maps API, to receive navigation directions to the waypoint. The user may also be able to use such a mapping function to receive directions to other displayed icons, such as friends in the active group.

Figure 14:
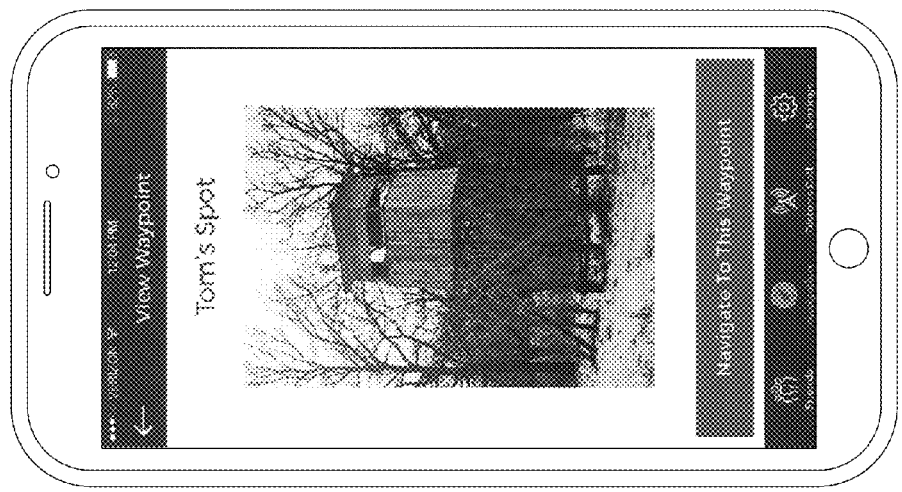
FIG. 14 illustrates an image displayed when a waypoint is selected from the navigation map according to an example embodiment of the present general inventive concept.
Figure 15:
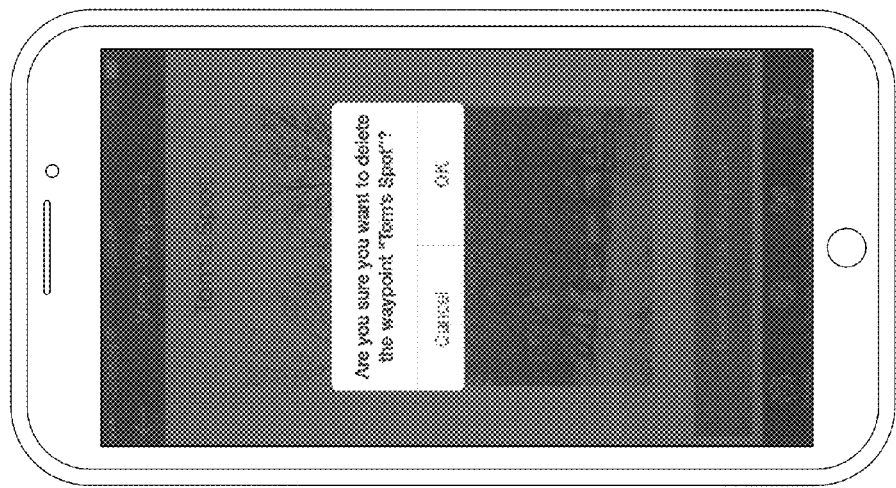
FIG. 15 illustrates a displayed GUI to confirm whether a user wishes to delete a waypoint according to an example embodiment of the present general inventive concept.

FIG. 14 illustrates an image displayed when a waypoint is selected from the navigation map according to an example embodiment of the present general inventive concept. In the example embodiment illustrated in FIG. 14, a user has selected the waypoint icon displayed in the navigation screen of FIG. 13, which is displayed as a place locator in FIG. 13, although different symbols may be used without departing from scope of the present general inventive concept. Upon selecting (e.g., touching) the waypoint icon in the navigation GUI, the display illustrated in FIG. 14 may be displayed to the user that has selected the icon. As illustrated in this example embodiment, the user viewing the waypoint photo and information may be presented with the opportunity to choose navigation directions to the waypoint. In various example embodiments, the user who has created the waypoint may be able to delete waypoint at any time. For example, if the user that created the waypoint clicks on the location icon to pull up the waypoint, a screen similar to the display in FIG. 14 may be shown on the communication device, but by recognizing the user as the registered user that created the waypoint, may also display a button on the GUI to allow the user to delete the waypoint. If the user wishes to delete the waypoint, the tracking program may prompt the user to confirm that the user wishes to delete the waypoint before it is actually deleted. FIG. 15 illustrates a displayed GUI to confirm whether a user wishes to delete a waypoint according to an example embodiment of the present general inventive concept. As shown in this example embodiment, the user may be given the choice of either canceling the request or confirming the deletion of the waypoint.

Figure 16:
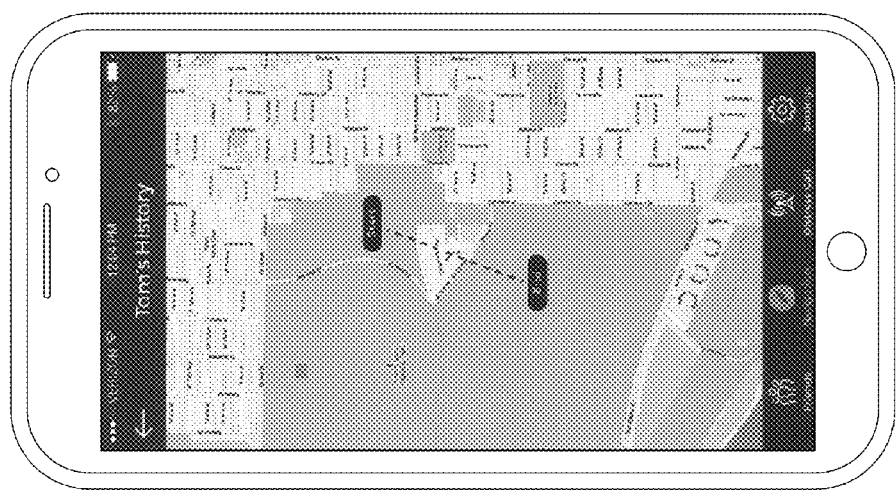
FIG. 16 illustrates a navigation display that visually tracks the movement of a user according to an example embodiment of the present general inventive concept.

According to various example embodiments of the present general inventive concept, a user of the tracking program may be able to see a movement history of one or more other users of the tracking program on the displayed map. FIG. 16 illustrates a navigation display that visually tracks the movement of a user according to an example embodiment of the present general inventive concept. In an example embodiment, an immediate user may choose him/herself, a friend from the active group, or a friend associated with an icon on a navigation display, or other type of designation, and request the movement history of that friend to be displayed. In the display illustrated in FIG. 16, the movement of a selected user (Tom) is displayed as a line from a start to an end point. In various example embodiments, the movement lines may only be shown on the user's device who is moving, and in other example embodiments the movement lines may be shared with other users, such as active group members. A user of the tracking program may be able to select another user on the displayed map and view that user's movement pattern over a specific time period.

Figure 17:
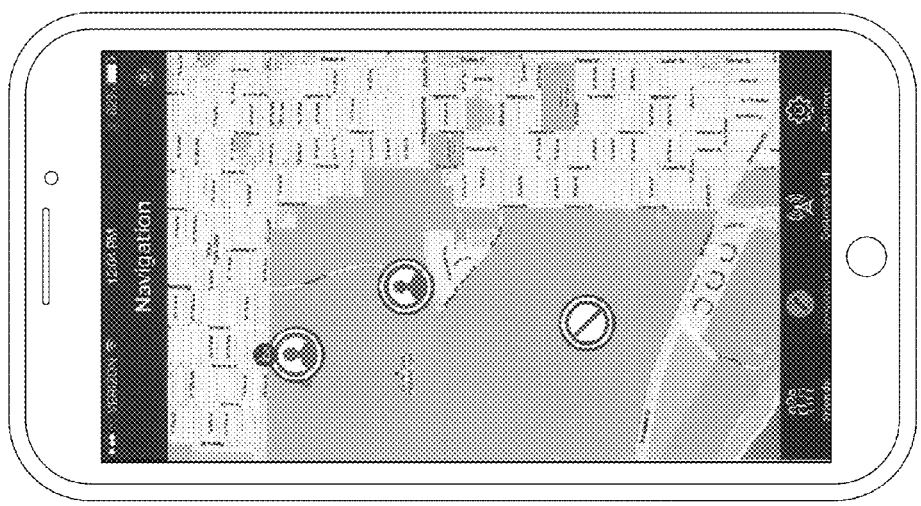
FIG. 17 illustrates a navigation display showing an active group member whose communication device battery has died according to an example embodiment of the present general inventive concept.

According to various example embodiments of the present general inventive concept, when the device battery of a user of the tracking program expires, the last location of that user may be shown on the displayed map with an indicator that the user's battery has expired. FIG. 17 illustrates a navigation display showing an active group member whose communication device battery has died according to an example embodiment of the present general inventive concept. In the example embodiment illustrated in FIG. 17, a user icon has been displayed with a dead battery indicator associated with the icon, which indicates that that user's device is no longer able to provide tracking information. In other words, the user associated with that icon is no longer able to provide updated information due to that user's device battery having expired.

Figure 18:
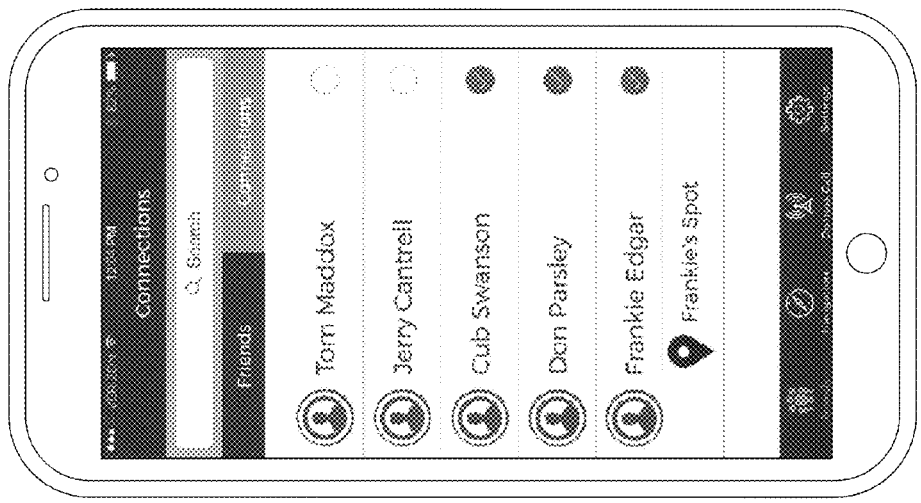
FIG. 18 illustrates a displayed GUI which displays a connections list and associated waypoints according to an example embodiment of the present general inventive concept.

FIG. 18 illustrates a displayed GUI which displays a connections list and associated waypoints according to an example embodiment of the present general inventive concept. In the illustrated example embodiment, all of the users that are connected to the immediate user are listed under the connections tab. The checkmarks in the example embodiment may indicate that the users are part of an active group, and the waypoint "Frankie's Spot" is associated with the user "Frankie Edgar". Thus, in various example embodiments, waypoints associated with the users listed in the connections display may be shown in association with those respective users, such as by indentation under the user's name, or any other easily discernible display which shows the association.

Figure 19:
FIG. 19 illustrates a displayed GUI which allows a user to activate a distress call according to an example embodiment of the present general inventive concept.

In the unfortunate situation in which a user of the tracking program is injured or otherwise needs assistance, various examples of the present general inventive concept provide the user of the tracking program the ability to activate a distress call to notify other users of the tracking program. FIG. 19 illustrates a displayed GUI which allows a user to activate a distress call according to an example embodiment of the present general inventive concept. In various example embodiments, a displayed GUI may include a menu at the top and/or bottom of the display that allows a user to quickly select, for example, a friends list, a navigation screen, a distress call, a settings screen, etc. The example embodiment illustrated in FIG. 19 shows a screen that may be displayed to a user that has selected the distress call button from the illustrated bottom menu, including an easily accessed button for the user to press to send the distress call out. As indicated on the screen, activating the distress call may notify all of the other users in the group. In various example embodiments, activating the distress call may notify all users of the tracking program within a certain range, and/or may send a signal to a predetermined emergency contact that does not need to be a user of the tacking program. Such a message could be an automatically generated text message, email, or the like.

Figure 20:
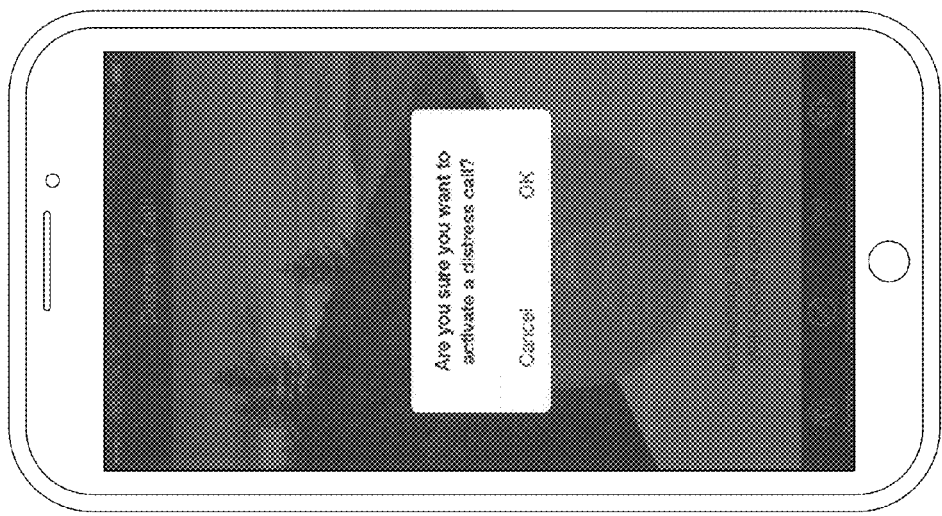
FIG. 20 illustrates a distress call confirmation GUI according to an example embodiment of the present general inventive concept.

FIG. 20 illustrates a distress call confirmation GUI according to an example embodiment of the present general inventive concept. After a user has chosen to activate a distress call through the screen illustrated in FIG. 19, example embodiments of the tracking program may control the communication device to display the screen of FIG. 20 to provide a verification of the activation of the distress call, to ensure a user does not erroneously activate such a call. In the example embodiment screen illustrated in FIG. 20, the user is able to either cancel or confirm the distress call. In various example embodiments, the distress call may only go to the user's active group members. In other example embodiments, the distress call may go to the entire Connections list, or to all users of the tracking program within a certain vicinity. In various example embodiments, activating the distress call may cause the camera flash of the communication device to begin a repeated pattern, and/or may initiate a repeated audible signal from the device at a high volume level. According to various example embodiments, the user activating the distress call may be able to send a push notification to all users in an active group when the distress call is activated. Another user receiving such a push notification may be able to tap on the notification displayed on that user's display screen to be shown a map view with the distressed user's current or last location.

Figure 22:
FIG. 22 illustrates a distress call cancellation GUI according to an example embodiment of the present general inventive concept.
Figure 21:
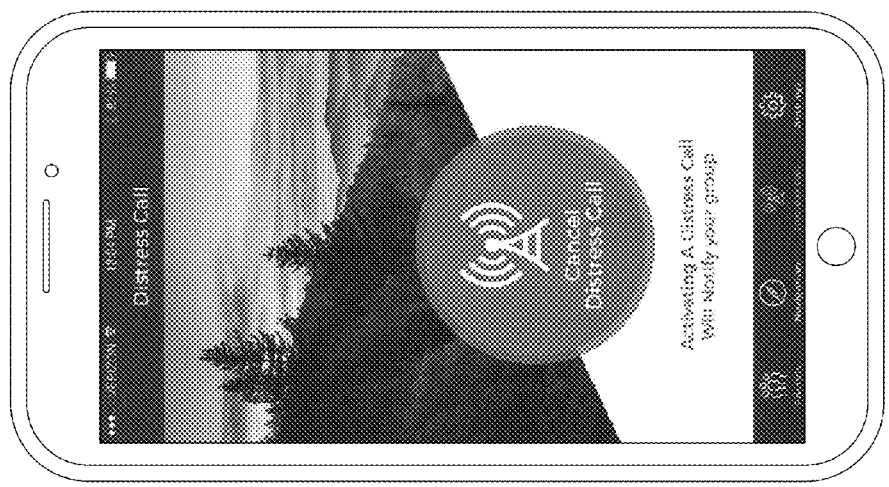
FIG. 21 illustrates a GUI displayed by the tracking program after activating a distress call according to an example embodiment of the present general inventive concept.

FIG. 21 illustrates a GUI displayed by the tracking program after activating a distress call according to an example embodiment of the present general inventive concept. According to various example embodiments, after a user has confirmed that the distress call be activated using the screen illustrated in FIG. 20, the tracking program may display to the distressed user an option to cancel the distress call by pressing a displayed button. Similar to the screen which offers the option to choose to activate the distress call, the distress call cancel button may be oversized and easy to discern in various example embodiments. If the user does press the cancel button, the tracking program may display a verification screen to the user to ensure that the distressed user has not chosen to end the distress call by accident. FIG. 22 illustrates a distress call cancellation GUI according to an example embodiment of the present general inventive concept.

Figure 24:
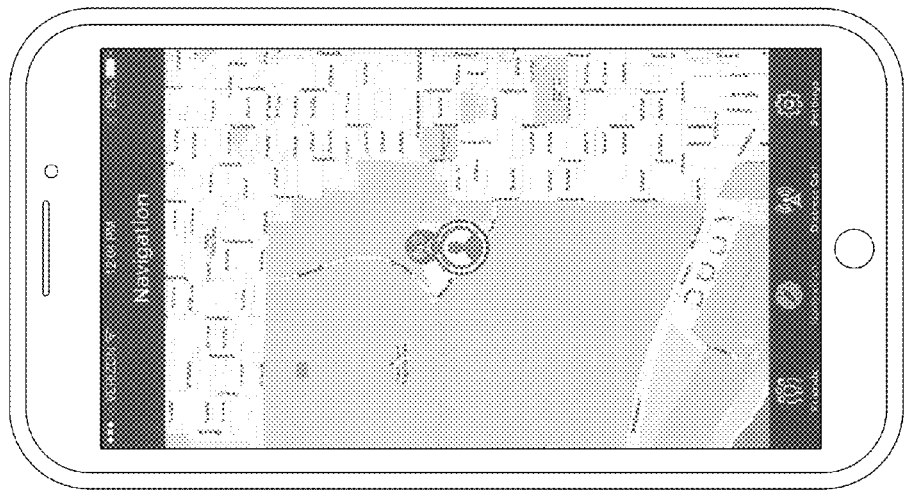
FIG. 24 illustrates a navigation screen indicating the location of a user that has activated a distress call according to an example embodiment of the present general inventive concept.
Figure 23:
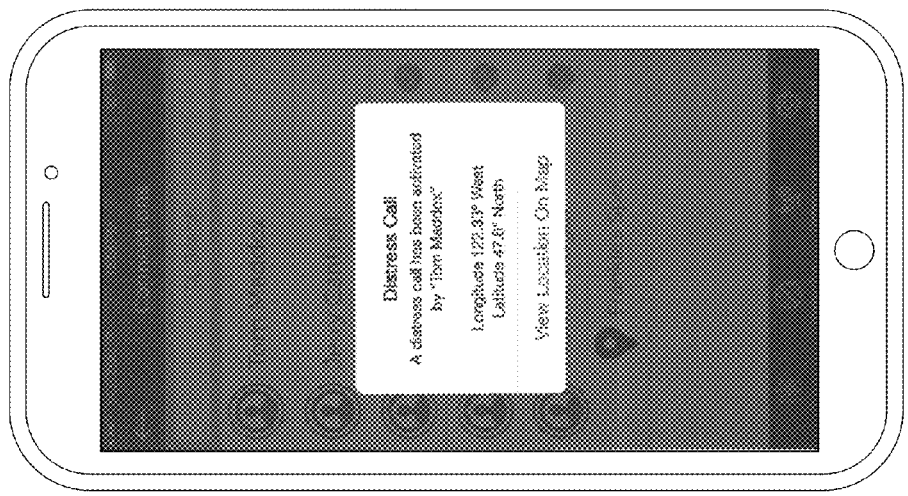
FIG. 23 illustrates a distress call notification screen displayed by the tracking program according to an example embodiment of the present general inventive concept.

FIG. 23 illustrates a distress call notification screen displayed by the tracking program according to an example embodiment of the present general inventive concept. According to various example embodiments, such a push notification may be displayed on the screens of communication devices in the distressed user's active group, and/or to any users of the tracking program within a predetermined radius of the distress call. As illustrated in FIG. 23, the push notification informs the other users that a distress call has been activated, and identifies the distressed party, along with giving location coordinates of the distressed party's location. Users receiving the push notification may be given the option of choosing to be shown the location of the distressed party on a map, e.g., on a navigation screen of the tracking program. FIG. 24 illustrates a navigation screen indicating the location of a user that has activated a distress call according to an example embodiment of the present general inventive concept. According to various example embodiments, the distress icon may be shown along with the distressed party's icon to emphasize the distress call, and/or to differentiate that user's icon with those of other users that may be displayed on the map. In various example embodiments, a button may be displayed on the screen of FIG. 24 that allows users to select and indicate that they will attempt to respond to the distress call. Such information may be sent to the sender of the distress call, and responders may also be indicated and tracked on the map to aid others that also wish to aid the user that is under distress. According to various example embodiments, different types of distress icons may also be displayed on the screen of FIG. 24. For example, different types of distress may be indicated by different icons, such as injured, severity and/or type of injury, lost, etc.

Figure 25:
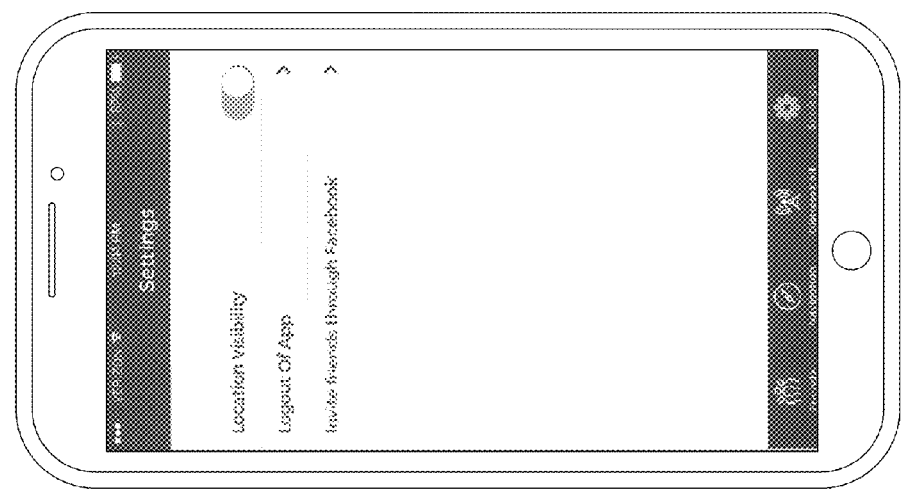
FIG. 25 illustrates a displayed GUI including settings of the tracking program according to an example embodiment of the present general inventive concept.

FIG. 25 illustrates a displayed GUI including settings of the tracking program according to an example embodiment of the present general inventive concept. In the example embodiment illustrated in FIG. 25, the user has chosen the settings option displayed at the bottom menu of the screen, and various settings that may be adjusted are displayed. Through such a Settings screen, a user may be able to disable their location visibility so that their location is not indicated on other users' screens, log out of the tracking program, invite friends through social media platforms such as Facebook to use the tracking program and/or join active group, and so on. Such activities as inviting friends through Facebook or other social media platforms may pull up further screens through which the user may interact to invite friends, etc.

Figure 26:
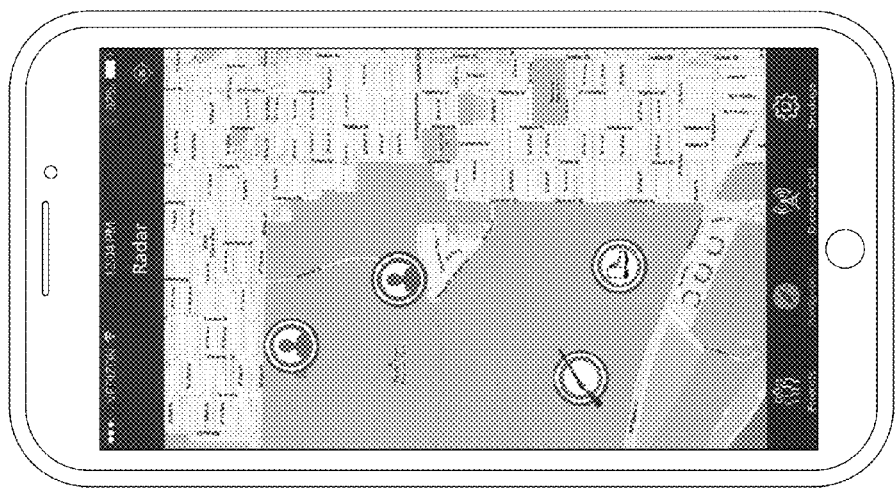
FIG. 26 illustrates a navigation GUI according to another example embodiment of the present general inventive concept.

FIG. 26 illustrates a navigation GUI according to another example embodiment of the present general inventive concept. The navigation GUI of FIG. 26 is similar to that illustrated in FIG. 9, except that some of the illustrated icons are shown with symbols indicating the activity of the user. For example, the screen of FIG. 26 indicates a location of a user that is hunting with a weapon icon (a rifle in this example embodiment), and further indicates a location of a user that is hiking with a boot icon. Various other symbols indicating a host of outdoor activities may be displayed without departing from the scope of the present general inventive concept. Such a display may provide further information to a user about the activities of the users of the tracking program in the areas close by the user. A user of the tracking program may indicate the activity the user is going to engage in, for example, when logging into the tracking program, and a corresponding symbol may be chosen by the user or automatically generated by the tracking program.

Figure 27:
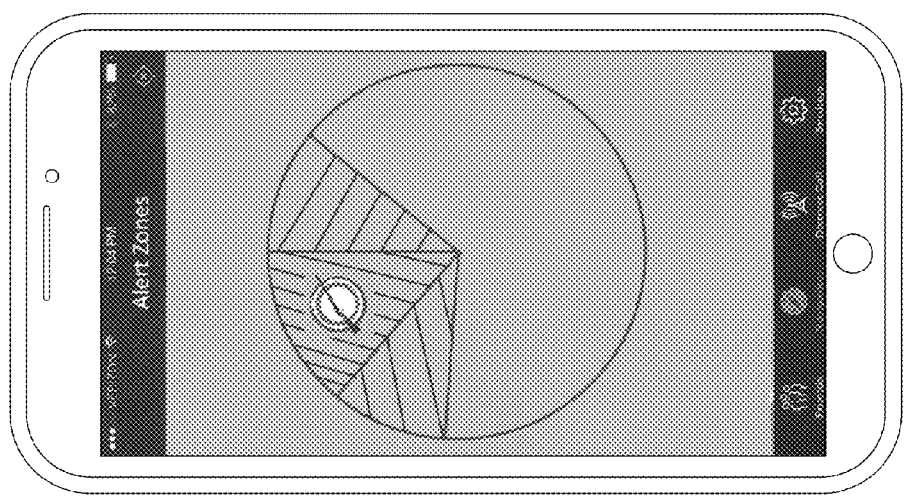
FIG. 27 illustrates a navigation GUI according to still another example embodiment of the present general inventive concept.

FIG. 27 illustrates a navigation GUI according to still another example embodiment of the present general inventive concept. In the example embodiment illustrated in FIG. 27, different zones of a predetermined radius around a user may be color coded or otherwise presented to quickly and easily indicate areas that may be more dangerous to the presence of hunters that may be firing various types of weapons. Such a zone oriented display may be overlaid upon the regular navigation map, or displayed by itself without the more specific map information, to indicate the direction in which a user may proceed to encounter the least likelihood of encountering various activities of other users that the immediate user wishes to avoid. In various example embodiments, the zone oriented display may also include icons indicating the presence and/or activities of other users in the various zones, or may simply present the zones themselves. For example, in the embodiment illustrated in FIG. 27, a user that has registered as engaging in hunting is north and slightly west of the immediate user's location. The example display of FIG. 27 indicates an area based around the hunting party as being dangerous (e.g., by coloring the area red), and the two areas adjacent to that area as being moderately safer (e.g., by coloring the area yellow). The rest of the area in the predetermined radius of the immediate user is indicated as safe (e.g., by coloring the area green). Various example embodiments may use colors, shading, and/or other indicia to indicate the safety levels, and may have fewer or more than the three degrees of safety illustrated in FIG. 27. The user may bring up such a display by selecting button entitled, for example, "Alert Zones" from a displayed menu on the communication device. It is understood that the zones marked as more or less dangerous may repeat numerous times in this display, according to the number and activities of the users in the area.

Information regarding the tracking program may be viewed on a website that provides static information about the tracking program, including screenshots, etc. The tracking program may be available for purchase and/or download from an app store such the Apple App Store. Terms and conditions for using the tracking program may be displayed to potential users, and these terms and conditions may need to be agreed to before the downloading of the program.

According to various example embodiments of the present general inventive concept, a user of the tracking program may be able to generate an email to a default tracking program email address by clicking a link on the website.

Various example embodiments of the present general inventive concept may provide a communications device, and machine readable instructions to control a communications device, to perform operations to track movements of associated users and display location and identification information on a display screen of the communications device. The tracking and user information may be stored remotely from the communication devices in one or more servers that communicate the information to the communication devices by any number of wired or wireless electronic communication, the computer data communications being transmitted upon request and/or due to push notifications resulting from the devices of other users.

According to various example embodiments of the present general inventive concept, a method of using a communication device having location identification technology to manage tracking information of a plurality of users is provided that includes storing identification information of a plurality of respective users, tracking locations of the users by receiving location information from each of the users' respective communication devices, and displaying the location information along with associated identification information of the users on a display screen of the communication device. The displayed location information may be presented as an icon on a graphical user interface (GUI) including navigation information. The method may further include providing additional identification information of a user associated with the icon in response to the icon being selected by a user interacting with the GUI. The icon may be graphically indicative of an activity in which the corresponding user is currently engaged. One or more icons associated with users registered in an active group may be differentiated from icons of one or more users not registered in the active group. The icons may be differentiated by color, size, configuration, or any combination thereof. The method may further include storing and displaying location information of waypoints identified by one or more of the users. The location information may include images that are selectably displayed by the users. The method may further include displaying movement history information associated with the users. The method may further include sending a distress call to other users in response to a user requesting the distress call to be sent. The distress call may include identification and location information of the user requesting the distress call. The method may further include displaying information identifying one or more users that enter a response indicating a response to the distress call. The method may further include designating two or more users as being associated with an active group, wherein users of the active group are differentiated from other users on the display of the location information. The user identification and location information may be communicated to and from the users' respective communication devices to one or more servers that store the received information and communicate with the communication devices through wireless computer data communication. The method may further include displaying one or more zones in a predetermined radius around the user that are color-coded according to a level of danger noted in the zones. A first zone which includes one or more hunters may be indicated as a high danger zone, and zones to either side of the high danger zone may be indicated as a moderate danger zone. The method may further include identifying each member of the active group with a custom icon to visually differentiate the respective members of the active group. The method may further include indicating the respective members' communication device battery level with the custom icon.

According to various example embodiments of the present general inventive concept, a method of using a communication device having location identification technology to manage tracking information of a plurality of users is provided that includes tracking locations of a plurality of users at communication devices of each of the respective users by receiving location information from each of the respective communication devices, and displaying the location information of each of the users on a display screen of the communication devices, wherein users for which the location information is displayed have logged in to a tracking program the controls their respective communication devices to perform the method of managing the tracking information.

According to various example embodiments of the present general inventive concept, a method of using a plurality of communication devices having location identification technology to manage tracking information of a plurality of users respectively associated with the communication devices is provided that includes prompting a user to log in to a tracking program stored on the user's communication device that performs the method of managing the tracking information, selectively displaying a GUI to allow the user to select other users to be part of an active group, or to join an already formed active group, and displaying a navigation GUI including mapping information indicating location information of any users in a displayed area that are logged in to the tracking program, wherein the location information of the users are displayed as corresponding icons on the navigation GUI, and icons associated with the active group are visually differentiated from users that are not associated with the active group.

As a non-exhaustive illustration only, a communication terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modification, and additional embodiments are possible, and, accordingly, all such variations, modifications, and embodiments are to be regarded as being within the spirit and scope of the present general inventive concept.

Various example embodiments of the present general inventive concept described herein may include operations performed by one or more processors, computers, etc., that are caused to perform these operations by instructions recorded on a non-transitory computer readable storage medium. Various ones of the operations and processes described and/or associated with the described various operations and processes may be performed on any of a host of devices, such as an online server, personal computer, smart phone, tablet computer, etc., or any device containing one or more processors to process such instructions.

Program instructions to perform a method described herein, or one or more operations thereof, may be recorded, stored, or fixed in one or more non-transitory computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and their corresponding descriptions as provided herein. Also, the described unit to perform an operation or a method may be hardware, software, or some combination of hardware and software. For example, the unit may be a software package running on a computer or the computer on which that software is running.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A method of using a mobile communication device having location identification technology to manage tracking information of a plurality of users, the method comprising:
    storing identification information of a plurality of respective users through the mobile communication devices of the respective users, each of the users storing that user's identification information through that user's mobile communication device;
    tracking locations of the users by sharing location information between each of the users' respective mobile communication devices; and
    displaying the location information along with associated identification information of the users on display screens of the communication devices of the users such that known users are differentiated from unknown users on each respective user's display screen.

2. The method of claim 1, wherein the displayed location information is presented as an icon on a graphical user interface (GUI) including navigation information.

3. The method of claim 2, further comprising providing additional identification information of a user associated with the icon in response to the icon being selected by a user interacting with the GUI.

4. The method of claim 2, wherein the icon is graphically indicative of an activity in which the corresponding user is currently engaged.

5. The method of claim 2, wherein one or more icons associated with users registered in an active group are differentiated from icons of one or more users not registered in the active group.

6. The method of claim 5, wherein icons are differentiated by color, size, configuration, or any combination thereof.

7. The method of claim 1, further comprising storing and displaying location information of waypoints identified by one or more of the users.

8. The method of claim 2, wherein the location information includes images that are selectably displayed by the users.

9. The method of claim 1, further comprising displaying movement history information associated with the users.

10. The method of claim 1, further comprising sending a distress call to other users in response to a user requesting the distress call to be sent.

11. The method of claim 10, wherein the distress call includes identification and location information of the user requesting the distress call.

12. The method of claim 10, further comprising displaying information identifying one or more users that enter a response indicating a response to the distress call.

13. The method of claim 1, further comprising designating two or more users as being associated with an active group, wherein users of the active group are differentiated from other users on the display of the location information.

14. The method of claim 1, wherein the user identification and location information are communicated to and from the users' respective communication devices to one or more servers that store the received information and communicate with the communication devices through wireless computer data communication.

15. The method of claim 1, further comprising displaying one or more zones in a predetermined radius around the user that are color-coded according to a level of danger noted in the zones.

16. The method of claim 15, wherein a first zone which includes one or more hunters is indicated as a high danger zone, and zones to either side of the high danger zone are indicated as a moderate danger zone.

17. The method of claim 5, further comprising identifying each member of the active group with a custom icon to visually differentiate the respective members of the active group.

18. The method of claim 17, further comprising indicating the respective members' communication device battery level with the custom icon.

19. A method of using a mobile communication device having location identification technology to manage tracking information of a plurality of users, the method comprising:
    tracking locations of a plurality of users through the mobile communication devices of each of the respective users by sharing location information between each of the respective mobile communication devices in a certain area; and
    displaying the location information of each of the users on display screens of the mobile communication devices of each of the users such that known users are differentiated from unknown users on each respective user's display screen;
    wherein users for which the location information is displayed have logged in to a tracking program that controls their respective mobile communication devices to perform the method of managing the tracking information.

* * * * *